(12) United States Patent
Zhu et al.

(10) Patent No.: US 11,732,167 B2
(45) Date of Patent: Aug. 22, 2023

(54) SILANE-CONTAINING HIGH MODULUS URETHANE ADHESIVES

(71) Applicant: DDP SPECIALTY ELECTRONIC MATERIALS US, LLC, Wilmington, DE (US)

(72) Inventors: Huide D. Zhu, Auburn Hills, MI (US); Daniel P. Sophiea, Auburn Hills, MI (US); Andrew R. Kneisel, Auburn Hills, MI (US); Matthew B. Feldpausch, Auburn Hills, MI (US); Susan P. Sevidal, Auburn Hills, MI (US)

(73) Assignee: DDP SPECIALTY ELECTRONIC MATERIALS US, LLC, Wilmington, DE (US)

(*) Notice: Subject to any disclaimer, the term of this patent is extended or adjusted under 35 U.S.C. 154(b) by 0 days.

(21) Appl. No.: 17/454,106

(22) Filed: Nov. 9, 2021

(65) Prior Publication Data

US 2022/0073796 A1 Mar. 10, 2022

Related U.S. Application Data

(63) Continuation of application No. 16/088,551, filed as application No. PCT/US2017/012165 on Jan. 4, 2017, now abandoned.

(60) Provisional application No. 62/328,048, filed on Apr. 27, 2016.

(51) Int. Cl.
| | |
|---|---|
| *C09J 175/04* | (2006.01) |
| *C09J 11/04* | (2006.01) |
| *C09J 11/06* | (2006.01) |
| C08K 3/04 | (2006.01) |
| C08K 5/5415 | (2006.01) |

(52) U.S. Cl.
CPC .............. *C09J 175/04* (2013.01); *C09J 11/04* (2013.01); *C09J 11/06* (2013.01); C08K 3/04 (2013.01); C08K 5/5415 (2013.01); C09J 2301/312 (2020.08)

(58) Field of Classification Search
CPC .... C09J 175/04; C09J 11/04; C09J 2301/312; C09J 11/06; C08K 3/04
USPC ........................................................ 524/588
See application file for complete search history.

(56) References Cited

U.S. PATENT DOCUMENTS

| | | | |
|---|---|---|---|
| 5,922,809 A | 7/1999 | Bhat et al. | |
| 6,512,033 B1 | 1/2003 | Wu | |
| 6,613,816 B2 | 9/2003 | Mahdi et al. | |
| 6,657,035 B1 | 12/2003 | Nakata et al. | |
| 9,475,972 B2* | 10/2016 | Sophiea | C08G 18/725 |
| 2002/0100550 A1 | 8/2002 | Mahdi et al. | |
| 2006/0124225 A1 | 6/2006 | Wu et al. | |
| 2011/0265932 A1* | 11/2011 | Jialanella | C08G 18/12 |
| | | | 156/60 |

FOREIGN PATENT DOCUMENTS

| | | |
|---|---|---|
| CN | 101087859 A | 12/2007 |
| JP | 2013-525575 A | 4/2012 |
| WO | 2001053423 A1 | 7/2001 |
| WO | 2011137047 A1 | 11/2011 |

OTHER PUBLICATIONS

Desmodur N 3300, Technical Data Sheet, Aug. 25, 2020. (Year: 2020).*
Birla Carbon, Raven 790 product brochure, 2017. (Year: 2017).*
Birla Carbon (Raven 790 product brochure, 2017).
International Search Report and Written Opinion for PCT Application No. PCT/US2017/012165, filed Jan. 4, 2017, dated Mar. 31, 2017 (8 pages).
International Preliminary Report on Patentability for PCT Application No. PCT/US2017/012165, filed Jan. 4, 2017, dated Oct. 30, 2018 (6 pages).

* cited by examiner

*Primary Examiner* — Hui H Chin

(57) ABSTRACT

Moisture-curable, one component adhesives contain an isocyanate-terminated prepolymer, a low molecular weight polyisocyanate compound, a hydrolysable mercaptosilane, a urethane catalyst and a carbon black filler. The adhesives exhibit an excellent combination of high modulus, excellent hydrolytic and heat stability, and high sag resistance.

9 Claims, No Drawings

SILANE-CONTAINING HIGH MODULUS URETHANE ADHESIVES

This invention relates to a new silane containing high modulus urethane adhesive composition. This invention also relates to a novel method of making such high modulus urethane adhesive composition.

Urethane adhesive compositions find applications in many industries. For the transportation industry, urethane adhesive compositions are used to bond glass objects such as a windshield or a backlight window into the car body structure. In order to provide adequate rigidity and thus better NVH performance to the car, it is desirable to use a urethane adhesive composition with a high modulus property after the composition is cured in place. In addition to the high modulus characteristics, it is also desirable that such urethane adhesive composition is usable and pumpable at room temperature without any or much additional heating. Furthermore, it is also desirable that the urethane adhesive can bond to the glass frit with great hydrolytic and heat stability.

Currently, high modulus urethane adhesive compositions can be achieved through the use of rigid polymer resins i.e., acrylic resins and/or crystalline polyester resins. These current existing compositions typically have high viscosities and most likely need heating during manufacturing and application.

The present invention provides a novel adhesive composition that exhibits similar or higher modulus and elongation when silanes are introduced in the mixer rather than introduced during the prepolymer resin synthesis. It is surprising to find that the adhesive composition containing mercaptosilane has superior performance in sag resistance. Further, it is surprising to find that a high modulus urethane adhesive composition is achieved with great hydrolytic and heat stability of glass adhesion when the adhesive composition is made in the presence of a mercaptosilane.

The adhesive composition of the present invention in one aspect comprises urethane prepolymer resin, a reactive silane, a polyisocyanate with functionality more than 2, one or more catalysts for the reaction of an isocyanate with a hydroxyl group; and a carbon black filler.

The adhesive composition of any of the foregoing aspects of the invention is dispensable at room temperature without any or much heating, exhibiting high modulus properties and sag resistance and having durable adhesion of great hydrolytic and heat stability.

In a particular aspect, the invention is a moisture-curable adhesive composition comprising:
 a) an isocyanate-terminated, prepolymer having free isocyanate groups and an isocyanate equivalent weight of 840 to 5,000;
 b) 0.1 to 6 parts by weight, per 100 parts by weight of the adhesive composition, of at least one polyisocyanate compound having an isocyanate equivalent weight of up to 300, the at least one polyisocyanate compound having a number average isocyanate functionality of at least 2.5;
 c) 0.1 to 4 parts by weight per 100 parts of the adhesive composition of at least one hydrolysable organosilane, the at least one hydrolysable organosilane including a mercaptosilane having one mercapto group and at least one hydrolysable silane group;
 d) at least one urethane catalyst and
 e) a carbon black filler.

The invention is also a method of making the adhesive composition of the invention, comprising the steps of:
 A) forming the isocyanate-terminated prepolymer;
 B) mixing the isocyanate-terminated prepolymer with the at least one hydrolysable silane, and then
 C) combining the at least one polyisocyanate compound having an isocyanate equivalent weight of up to 300, urethane catalyst and carbon black with the mixture of the isocyanate-terminated prepolymer with the at least one hydrolysable silane.

The invention is also a method of making the adhesive composition of the invention, comprising the steps of:
 A) forming the isocyanate-terminated prepolymer;
 B) mixing the isocyanate-terminated prepolymer with the at least one polyisocyanate compound having an isocyanate equivalent weight of up to 300; and then
 C) combining the at least one hydrolysable silane, urethane catalyst and carbon black with the mixture of the isocyanate-terminated prepolymer with the at least one hydrolysable silane.

In another aspect, the invention is a method for bonding two or more substrates together which comprises contacting a moisture-curable adhesive composition according to the invention with one or more of the substrates and contacting the two or more substrates with the adhesive composition disposed at a bond line between the substrates and thereafter allowing the composition to cure to form an adhesive layer bonded to the substrates at the bond line.

The prepolymer has an isocyanate equivalent weight of at least 840, which corresponds to an NCO content of 5% by weight. The isocyanate equivalent weight of the prepolymer may be at least 1050 (NCO content 4%), at least 1400 (NCO content 3%) or at least 1680 (NCO content 2.5%), and may be up to, for example, 10,000 (NCO content 0.42%), up to 8400 (NCO content 0.5%), up to 7000 (NCO content 0.6%) or up to 5000 (NCO content 0.84%). Prepolymer equivalent and molecular weights are determined according to the procedure disclosed in U.S. Pat. No. 5,922,809 at column 12, lines 50 to 64, incorporated herein by reference.

The prepolymer is a reaction product of at least one polyol with at least one polyisocyanate having an isocyanate equivalent weight of up to 250. The polyol or mixture of polyols (when used) preferably has a hydroxyl equivalent weight of at least 200 (equivalent to a hydroxyl number of 280). The hydroxyl equivalent weight may be at least 500 (OH number=112), at least 800 (OH number=70) or at least 1000 (OH number 56), and may be up to 4750 (OH number 11.8), up to 3000 (OH number 18.7), up to 2500 (OH number 22.4). Polyol equivalent weights are determined by titration methods. Equivalent weights for polyol mixtures are determined by titrating the mixture, or by titrating the individual components and determining a number average. If a mixture of polyols is used, it is preferred that at least one component of the mixture has a hydroxyl equivalent weight from 500 to 3000, especially from 800 to 2000.

The polyol or mixture of polyols (when used) has a number average nominal hydroxyl functionality of at least 1.5 or at least 1.8. The hydroxyl functionality may be at least 2.0 or at least 2.2, and may be up to 4, up to 3.5, up to 3.0 or up to 2.7. "Nominal" functionality of a polyol is the calculated number of hydroxyl groups per molecule based on the starting materials used in producing the polyol. In the case of polyether polyols, the nominal functionality is the average number of hydroxyl groups per molecule of the initiator compound or compounds used in making the polyether polyol. As is well known, the actual functionality of polyether polyols tends to be somewhat lower than the nominal functionality due to side-reactions that occur during the polymerization of alkylene oxides.

In a preferred embodiment, the polyol is a polymer mixture that includes at least one nominally difunctional polyol and at least one nominally trifunctional polyol. Such a mixture may have an average hydroxyl functionality of 2.2 to 2.7.

Polyols useful to prepare the prepolymer include those disclosed in Wu, U.S. Pat. No. 6,512,033 at column 4, line 10 to line 64, incorporated herein by reference. Among these are, for example, polyether polyols, polyester polyols, poly(alkylene carbonate) polyols, hydroxyl containing polythioethers, polymer polyols (dispersions of polymer particles in any of the foregoing polyols) and mixtures of any two or more thereof.

Polyether polyols are a preferred type. The polyether polyol may be, for example, a polymer or copolymer of tetrahydrofuran, and/or one or more alkylene oxides such as ethylene oxide, 1,2-propylene oxide, 1,2-butylene oxide, 2,3-butylene oxide, and mixtures of any two or more thereof. An especially preferred polyether polyol is a homopolymer of 1,2-propylene oxide, a random copolymer of at least 50% by weight 1,2-propylene oxide and ethylene oxide, or a block copolymer of 1,2-propylene oxide and ethylene oxide. These polyether polyols may have be capped with ethylene oxide to produce more reactive primary hydroxyl groups.

The polyisocyanate used to make the prepolymer is one or more compounds having 2 or more isocyanate groups and an isocyanate equivalent weight of up to 300, preferably 75 to 250. This polyisocyanate preferably has an average isocyanate functionality of 2 to 4, more preferably 2 to 3.5, still more preferably 2 to 2.5 and even more preferably 2 to 2.2. The polyisocyanate may be an aliphatic, cycloaliphatic, araliphatic, heterocyclic or aromatic polyisocyanate, or a mixture of any two or more thereof. Aromatic polyisocyanates are especially preferred for making the prepolymer. A mixture of at least one aromatic polyisocyanate and a minor amount (such as up to 20 weight percent based on the total weight of the polyisocyanates used to make the prepolymer) can be used.

Examples of aromatic polyisocyanates include diphenylmethane diisocyanate (MDI) and polymethylene polyphenylisocyanates, polymeric MDI (PMDI, a mixture of diphenylmethane diisocyanate and polymethylene polyphenylisocyanates), tetramethylxylene diisocyanate and toluene diisocyanate, any of which may be modified to include biuret, allophonate, urea, carbamate, isocyanurate or carbodiimide groups.

Examples of aliphatic polyisocyanates include isophorone diisocyanate, 1,6-hexamethylene diisocyanate, bis(4-isocyanatocylohexyl))methane ($H_{12}$MDI) and trimethyl hexamethylene diisocyanate, any of which may be modified to include biuret, allophonate, urea, carbamate, isocyanurate or carbodiimide groups.

The prepolymer is prepared by reacting the polyol(s) with the polyisocyanate, at proportions that provide more than 1 equivalent, preferably 1.5 to 2.5 or 1.5 to 2.1 equivalents, of isocyanate groups per equivalent of hydroxyl group, and reacting the mixture until the hydroxyl groups have become consumed. The prepolymer may be prepared by any suitable method, such as bulk polymerization and solution polymerization. The reaction preferably carried out under anhydrous conditions, preferably under an inert atmosphere such as a nitrogen blanket. The reaction is preferably carried out at a temperature between about 0° C. and about 150° C., more preferably between about 25° C. and about 90° C. The reaction is generally performed until the residual isocyanate content reaches a constant value, indicating that all hydroxyl groups have been consumed. The reactions may be carried out in the presence of a urethane catalyst such as is described below.

The prepolymer may be prepared in the presence of a plasticizer as described below. In some embodiments, the amount of plasticizer present during the preparation of the prepolymer is selected so that the resulting mixture of prepolymer and plasticizer has a desirable viscosity. Preferably, the resulting mixture of prepolymer and plasticizer has a Brookfield viscosity of at least 6,000 centipoises or at least about 8,000 centipoises, and as much as 30,000 centipoises or as much as 20,000 centipoises. Brookfield viscosity is measured on a Model DV-E Brookfield Viscometer or equivalent, with a RV spindle #5 at a speed of 5 revolutions per second and at a temperature of 25° C.

The prepolymer constitutes at least 30%, at least 35%, at least 40%, at least 50% or at least 55% percent of the total weight of the adhesive composition. It may constitute up to 95%, up to 90%, up to 75% or up to 70% of the total weight of the adhesive composition.

In some embodiments, at least a portion of the isocyanate-terminated prepolymer is a polyester-containing prepolymer prepared in a reaction of an excess of polyisocyanate with one or more polyester polyols which are solid at room temperature. Preferably, the polyester polyols have melting points of about 40° C. or greater, about 45° C. or greater and most preferably about 50° C. or greater, up to about 85° C. and more preferably up to about 70° C. Preferably, the polyester-containing prepolymer constitutes at least about 0.5% by weight or at least about 1% of the weight of the adhesive composition, and may constitute, for example, up to about 5% or up to about 3% by weight of the weight of the adhesive composition. Preferred polyester polyols are prepared from linear diacids and linear diols. A more preferred diacid is adipic acid. More preferred diols are the C2 to C6 diols, such as butane diols, pentane diols and hexane diols. Preferred polyester polyols are available from Evonik under the trade name Dynacoll™ and the designations 7360, 7330, and 7381. The polyester polyol based isocyanate prepolymer can be prepared using the processes and isocyanates described hereinbefore.

The adhesive composition of the invention further comprises 0.1 to 6 parts by weight of at least one polyisocyanate compound having an isocyanate equivalent weight of up to 300, per 100 parts by weight of the adhesive composition. This additional polyisocyanate has an isocyanate functionality of at least 2.5, preferably at least 2.7, more preferably at least 2.9. The isocyanate functionality may be, for example, up to 4 or up to 3.5. Average isocyanate functionality is determined according to U.S. Pat. No. 5,922,809 at column 12, line 65 to column 13, line 26, incorporated herein by reference.

Preferred additional polyisocyanates include polymeric MDI, polymethylene polyphenylisocyanates, trimerized aromatic and/or aliphatic polyisocyanates such as partially or fully trimerized MDI, partially or fully trimerized toluene diisocyanate and partially or fully trimerized 1, 6-hexamethylene diisocyanate. At least a portion of the additional polyisocyanate preferably is an aliphatic polyisocyanate. The additional polyisocyanate may be, for example, a partially or fully trimerized 1, 6-hexamethylene diisocyanate or a mixture thereof with an aromatic polyisocyanate such as a polymethylene polyphenylisocyanate or PMDI.

The adhesive composition of the invention further comprises at least one hydrolysable mercaptosilane. The mercaptosilane is characterized as having one, preferably exactly one, mercapto group and at least one, preferably 1 to 3 and more preferably 1 to 2, hydrolysable silane groups.

A hydrolysable silane group is a group containing a silicon atom and at least one hydrolysable substituent bonded to the silicon atom. The hydrolysable silane group may contain 1, 2 or 3 hydrolysable substituents. The silicon atom is bonded to the remainder of the compound (and in particular to the mercapto group) through a non-hydrolysable linkage.

A hydrolysable substituent is one that reacts with water to eliminate the substituent and produce a silanol moiety, —Si—OH, which can further react to form a siloxane linkage (—Si—O—Si—). Hydrolysable substituents include halogen, particularly chlorine; alkoxy groups, particularly $C_{1-6}$ alkoxy and especially methoxy and ethoxy; phenoxy or ring-substituted phenoxy groups, acyloxy groups such as acetoxy; trialkyl siloxy groups, which may be substituted on one or more of the alkyl groups, such as trimethyl siloxy and triethyl siloxy; triphenyl siloxy, which may be substituted on one or more of the phenyl rings; alkenyloxy groups such as isopropenyloxy; and ketoximato groups such as dimethylketoximato, diethylketoximato, dicyclohexylketoximato, and methylethylketoximato.

Examples of hydrolysable silane groups include trichlorosilyl, methyldichlorosilyl, dimethylchlorosilyl, phenyldichlorosilyl, (trimethylsiloxy)dimethylsilyl, trimethoxysilyl, triethoxysilyl, methyldiethoxysilyl, methyldimethoxysilyl, dimethylmethoxysilyl, diethylmethoxysilyl, phenyldimethoxysilyl, trimethylsiloxymethylmethoxylsilyl, trimethylsiloxydiethoxysilyl, methyldiacetoxysilyl, phenydiaectoxysilyl, triacetoxysilyl, trimethylsiloxymethylacetoxysilyl, trimethylsiloxydiacetoxysilyl, bis(dimethylketoximato) methylsilyl, bis(cyclohexylketoximato)methylsilyl, bis(diethylketoximato)trimethylsiloxysilyl, bis(methylethylketoximato)methylsilyl, tris(acetoximato)silyl, and methylisopropyenyloxysilyl. A preferred hydrolysable silane group is a trialkoxysilyl group such as trimethoxysilyl and triethoxysilyl.

An especially preferred mercaptosilane is a mercaptoalkyl (trialkoxy)silane or mercaptoalkylmethyl(dialkoxy)silane such as gamma-mercaptopropyl tri(methoxy)silane or gamma-mercaptopropylmethyl(dimethoxy)silane.

The adhesive contains 0.1 to 4 parts by weight of the mercaptosilane per 100 parts weight of the adhesive composition. The mercaptosilane may constitute, for example, preferably at least 0.2 percent, at least 0.3 percent or at least 0.5 percent by weight of the adhesive composition. The mercaptosilane may constitute up to 3.0 percent, up to 2.0 percent or up to 1.5 percent of the weight of the adhesive composition.

The adhesive composition of the invention may further comprise one or more additional hydrolysable organosilanes that do not contain mercapto groups, such as one or more epoxysilanes, acrylic silanes, isocyanatosilanes and other hydrolysable silanes containing at least one hydrolysable silane group. The hydrolysable organosilanes as those disclosed in Mahdi, U.S. Patent Publication 2002/0100550 paragraphs 0043 to 0047 and 0055 to 0065, incorporated herein by reference. More specific examples include bis-(gamma-trimethoxysilylpropyl)amine, gamma-aminopropyltrimethoxysilane, N-beta-(aminoethyl)-gamma-aminopropyltrimethoxysilane, gamma-glycidoxypropyl trimethoxysilane, gamma-methacryloxypropyltrimethoxysilane, and gamma-isocyanatopropyltrimethoxysilane.

The adhesive composition also contains one or more urethane catalysts, i.e., materials that catalyze the reaction of isocyanate moieties with water and/or a hydroxyl, mercapto or amino group. Suitable catalysts include, for example, metallic catalysts such as metal chelates, carboxylates and organometallic compounds, as well as tertiary amines and mixtures of any two or more thereof. Preferred metallic catalysts include tin carboxylates, organotin compounds and tin alkanoates. A mixture of a tertiary amine and an organometallic compound is preferred. Suitable organometallic compounds include organotin compounds such as alkyltin oxides, stannous alkanoates, dialkyltin dicarboxylates, dialkyltin dimercaptanoates, and dialkyltin mercaptides. Stannous Metal alkanoates include stannous octoate, bismuth octoate or bismuth neodecanoate. Preferred examples of dialkyltin dicarboxylate catalysts include 1,1-dimethyltin dilaurate, 1,1-dibutyltin diacetate, 1,1-dimethyltin dimaleate and dimethyltin dineodecanoate. Preferred metal alkanoates include bismuth octoate or bismuth neodecanoate. Preferably, metallic catalyst(s) are present in an amount of about 60 parts per million or greater based on the weight of the adhesive composition, more preferably 120 parts per million or greater. Preferably, the metallic catalysts constitute up to 1.0 percent, more preferably no more than 0.5 weight percent or up to 0.1 weight percent of the adhesive composition.

Preferred tertiary amine catalysts include dimorpholinodialkyl ether, a di((dialkylmorpholino)alkyl)ether, bis-(2-dimethylaminoethyl)ether, triethylene diamine, pentamethyldiethylene triamine, N,N-dimethylcyclohexylamine, N,N-dimethyl piperazine 4-methoxyethyl morpholine, N-methlmorpholine, N-ethyl morpholine and mixtures thereof. A preferred dimorpholinodialkyl ether is dimorpholinodiethyl ether. A preferred di((dialkylmorpholino)alkyl)ether is (di-(2-(3,5-dimethylmorpholino)ethyl)-ether). Tertiary amines may constitute, for example, at least 0.01 weight percent, at least 0.05 weight percent, at least 0.1 weight percent or at least 0.2 weight percent of the adhesive composition, and may constitute, for example, up to 2.0 weight percent, up to 1.75 weight percent, up to 1.0 weight percent or up to 0.5 weight percent of the adhesive composition.

In some embodiments, the amount of catalyst(s) is selected such that the adhesive composition has a working time of at least 6 minutes, preferably at least 10 minute. Working time is the time period after exposure to 23° C./50% relative humidity condition before the composition becomes unable to bond to a substrate. Preferably, the composition of the invention is formulated to provide a working time of about 6 minutes or greater and more preferably about 10 minutes or greater. Preferably, the working time is about 40 minutes or less and more preferably about 30 minutes or less.

The composition of the invention also comprises carbon black. The carbon black used in this invention may be a conductive carbon black, which is not specially treated (surface treated or oxidized) to render it nonconductive. One or more nonconductive carbon blacks may be used in conjunction with the conductive carbon black.

Examples of useful, commercially available carbon black products include those sold as RAVEN™ 790, RAVEN™ 450, RAVEN™ 500, RAVEN™ 430, RAVEN™ 420, RAVEN™ 410, RAVEN™ 1040 and RAVEN™ 1060 carbon blacks, all available from Colombian, CSX™, Monarch™ and Elftex™ carbon blacks available from Cabot Corporation and Printex™ carbon black available from Degussa.

A preferred carbon black exhibits an oil absorption number of at least 80, preferably at least 90 and more preferably at least 95, cubic centimeters of dibutyl phthalate per 100 g of carbon black, as measured according to ASTM D-2414-09. In addition, the carbon black desirably has an iodine number at least 80. The iodine number is determined by ASTM D1510-11.

The adhesive composition may contain, for example, at least 10, at least 12 or at least 15 weight percent carbon black, based on the total weight of the adhesive composition. The adhesive composition may contain up to 35 weight percent, up to 30 weight percent or up to 25 weight percent carbon black, based on the total weight of the composition.

In addition to the foregoing materials, the adhesive composition of the invention may contain various optional ingredients.

The composition of the invention preferably comprises one or more plasticizers to modify the rheological and viscosity properties of the adhesive composition to a desired consistency. Suitable plasticizers should be free of water, be inert to isocyanate groups and be compatible with the prepolymer (i.e., does not phase separate therefrom upon standing at room temperature). Suitable plasticizers include straight and branched alkylphthalates, such as diisononyl phthalate, dioctyl phthalate and dibutyl phthalate, a partially hydrogenated terpene commercially available as "HB-40", trioctyl phosphate, epoxy plasticizers, toluene-sulfamide, chloroparaffins, adipic acid esters, castor oil xylene, 1-methyl-2-pyrrolidinone and toluene, alkylbenzoate, soybean oil methyl esters, dialkylbenzoate under K-Flex™, castor or rapeseed oil methyl esters, alkyl sulfonic esters such as Mesmoll™ from LANXESS Deutschland GmbH.

The amount of plasticizer in the adhesive composition of the invention may be, for example, at least 1 weight percent, at least 5 parts by weight or greater or at least 10 parts weight percent, based on the total weight of the adhesive composition. The plasticizer is preferably present in an amount of no more than 40 weight percent or at most 30 parts by weight, on the same basis. Most or all of the plasticizer is preferably introduced during the preparation of the prepolymer.

The adhesive composition of the invention may further comprise one or more additional particulate fillers such as, for example, clay, calcium oxide, calcium carbonate, ground class, ceramics such as boron nitride, metals, cross-linked organic polymers, lignocelluosic powders, and fumed silica. A preferred filler includes calcium carbonate. The calcium carbonate particles may be untreated or surface modified by treatment with chemicals, such as organic acids or esters of organic acids. In some embodiments, calcium carbonate constitutes at least 1 weight percent, at least weight percent, at least 3 weight percent or at least 5 weight percent of the total weight of the adhesive composition. Calcium carbonate may constitute, for example, up to 30 weight percent, up to 20 weight percent, up to 15 weight percent or up to 10 weight percent, on the same basis.

The adhesive composition of the invention may further comprise one or more moisture stabilizers, which function to inhibit advancement and preventing premature crosslinking. Included among such moisture stabilizers are diethylmalonate, alkylphenol alkylates, paratoluene sulfonic isocyanates, benzoyl chloride and orthoalkyl formates. Such stabilizers are preferably used in an amount of at least 0.1 weight percent, at least 0.5 weight percent or at least 0.8 weight percent, based on the total weight of the adhesive composition, up to 5.0 weight percent, up to 2.0 weight percent or up to 1.4 weight percent.

The adhesive compositions can also contain heat stabilizers such as alkyl substituted phenols, phosphites, sebacates and cinnamates. If present, a preferred heat stabilizer is an organophosphite as disclosed in U.S. Pat. No. 6,512,033, incorporated herein by reference. The heat stabilizer may constitute at least 0.01 or at least 0.3 weight percent based on the entire weight of the adhesive composition, up to at most 5 weight percent, up to 2 weight percent or up to 1.0 weight percent. The adhesive composition may be devoid of such a heat stabilizer.

The composition of the invention may further comprise an ultraviolet light absorber (UV light stabilizer). Useful UV light absorbers include benzophenones and benzotriazoles. Specific UV light absorbers include those from BASF such as TINUVIN™ P, 2-(2'-hydroxy-5'-methylphenyl)-benzotriazole; TINUVIN™ 326, 2-(5-chloro-2H-benzotriazol-2-yl)-6-(1,1-dimethylethyl)-4-methylphenol; TINUVIN™ 213 poly(oxy-1,2-ethanediyl), (α,(3-(3-(2H-benzotriazol-2-yl)-5-(1,1-dimethylethyl)-4-hydroxyphenyl)-1-oxopropyl-w-hydroxy; poly(oxy-1,2-ethanediyl), (α,(3-(3-(AH-benzotriazol-2-yl)-5-(1,1-dimethylethyl)-4-hydroxyphenyl)-1-oxopropyl)-ω-(α, (3-(3-(2H-benzotriazol-2-yl)-5-(1,1-dimethylethyl)-4-hydroxyphenyl)-1-oxopropyl); TINUVIN™ 327, 2-(3,5-di-tert-butyl-2-hydroxyphenol)-5-chlorobenzotriazole; TINUVIN™ 571, 2-(2H-benzotriazol-2-yl)-6-dodecyl-4-methylphenol, branched and linear; TINUVIN™ 328, 2-(2H-benzotriazol-2-yl)-4,6-bis(1,1-dimethylpropyl)phenol and from Cytec such as CYASORB™ UV-9,2-hydroxy-4-methoxybenzophenone; CYASORB™ UV-24, 2,2'-dihydroxy-4-methoxybenzophenone; CYASORB™ UV-1164, -[4,6-bis(2,4-dimethylphenyl)-1,3,5-triazin-2-yl]-5-(octyloxy) phenol; CYASORB™ UV-2337, 2-(2'-hydroxy-3'-5'-di-t-amylphenyl)benzotriazole; CYASORB™ UV-2908, 3,5-di-t-butyl-4-hydroxybenzoic acid, hexadecyl ester; CYASORB™ UV-5337, 2-(2'-hydroxy-3',5'-di-t-butylphenyl)-5-chlorobenzotriazole; CYASORB™ UV-531, 2-hydroxy-4-n-octoxybenzophenone; and CYASORB™ UV-3638, 2,2-(1,4-phenylene)bis[4H-3,1-benzoxazin-4-one]. Among these, 2-hydroxy-4-n-octoxybenzophenone and 2-(2H-benzotriazol-2-yl)-6-dodecyl-4-methylphenol, branched and linear, are preferred. One or more UV light absorbers may constitute at least 0.1 weight percent, at least 0.2 weight percent or at least 0.3 parts by weight of the weight of the adhesive composition, and may constitute up to 3 weight percent, up to 2 weight percent or up to 1 weight percent thereof.

The adhesive composition of the invention may further include one or more light stabilizers. Preferred light stabilizers included hindered amine light stabilizers such as TINUVIN™ 144, n-butyl-(3,5-di-ter-butyl-4-hydroxybenzyl)bis-(1,2,2,6-pentamethyl-4-piperidinyl) malonate; TINUVIN™ 622, dimethyl succinate polymer with 4-hydroxy-2,2,6,-tetramethyl-1-piperidine ethanol; TINUVIN™ 77, bis(2,2,6,6,-tetramethyl-4-piperidinyl) sebacate; TINUVIN™ 123, bis-(1-octyloxy-2,2,6,6,tetramethyl-4-piperidinyl) sebacate; TINUVIN™ 765, bis(1,2,2,6,6,-pentamethyl-4-piperidinyl) sebacate; CHIMASSORB™ 944 poly[[6-[1,1,3,3-tetramethyl-butyl)amino]-1,3,5-triazine-2,4-diyl][(2,2,6,6-tetramethyl-4-piperidinyl)imino]-1,6-hexanediyl[(2,2,6-tetramethyl-4-piperidinyl)imino]]) available from Cytec; CYASORB™ UV-500, 1,5-dioxaspiro(5,5)undecane 3,3-dicarboxylic acid, bis(2,2,6,6,-tetramethyl-4-piperidinyl)ester; CYASORB™ UV-3581, 3-dodecyl-1-(2,2,6,6,-tetramethyl-4-piperidyl-pyrrolidin-2,5-dione) and CYASORB™ UV-3346, poly[(6-morpholino-s-triazine-2,4-diyl)[2,2,6,6-tetramethyl-4-piperidyl)imino]-hexamethylene[(2,2,6,6-tetramethyl-4-piperidyl)imino]], all available from Ciba-Geigy. Among these, bis-(1-octyloxy-2,2,6,6,tetramethyl-4-piperidinyl) sebacate and bis(1,2,2,6,6,-pentamethyl-4-piperidinyl) sebacate are preferred types. The light stabilizer(s) may constitute at least 0.1 weight percent, at least 0.2 weight percent or at least 0.3 weight percent of the adhesive composition, and may constitute up to 3 weight percent, up to 2 weight percent or up to 1.5 weight percent thereof.

The adhesive composition of the invention may further comprise a hydrophilic material that functions to draw atmospheric moisture into the composition. This material enhances the cure speed of the formulation by drawing atmospheric moisture to the composition. Preferably, the hydrophilic material is a liquid. Among the useful hydrophilic materials are pyrrolidines such as 1 methyl-2-pyrrolidone (or N-methyl pyrrolidone). Other hydrophilic materials include ethylene oxide containing polyether polyols and catalytically active polyols containing amine groups, which can be present as separate ingredients or used as a polyol ingredient in making the prepolymer described above. When added as a separate ingredient, the hydrophilic material may constitute at least 0.1 weight percent or at least 0.3 weight percent of the total weight of the adhesive composition, and may constitute up to 1.0 weight percent or up to 0.6 weight percent thereof.

Optionally, the composition may further comprise a thixotrope (rheological additive). Such thixotropes are well known to those skilled in the art and include fumed silica, treated silica and the like. The thixotrope may constitute at least 0.1 weight percent or at least 1 weight percent of the adhesive composition, up to 10 weight percent or up to 2 percent by weight thereof.

The various components of the adhesive composition preferably are combined under an inert atmosphere in the absence of oxygen and atmospheric moisture, so as to prevent premature reaction. Preferably, the materials are blended under vacuum or an inert gas, such as nitrogen or argon. Any amount of plasticizer not added during prepolymer formation can be added when the prepolymer is blended with the other components of the adhesive. The ingredients are blended for a sufficient time to prepare a well-blended mixture, preferably from about 10 to about 60 minutes. Preferably the ingredients are blended at a temperature of about 25° C. to about 90° C. Once the adhesive composition is formulated, it is packaged in a suitable container such that it is protected from atmospheric moisture and oxygen.

The viscosity of the adhesive composition can be expressed as a press flow viscosity, which is the amount of time (in seconds) for 20 g of the adhesive composition to pass through a 4.0 mm orifice under 552 kPa applied pressure at 23° C. The press flow viscosity may be, for example, at least 5 seconds, at least 10 seconds, at least 20 seconds or at least 25 seconds and may be, for example, up to 200 seconds, up to 100 seconds or up to 60 seconds. The amount of plasticizer in some embodiments is selected such that the press flow viscosity of the adhesive composition is within these ranges.

The composition of the invention is useful for bonding substrates, which can be porous or nonporous. The composition is applied to a first substrate and the composition on the first substrate is thereafter contacted with a second substrate. Thereafter, the composition is exposed to curing conditions, which generally include the presence of moisture. The moisture can be atmospheric moisture and/or liquid water. Curing can be performed under ambient conditions, such as ambient humidity and temperatures up to for example 40° C. An elevated temperature may be applied to accelerate the cure.

In a preferred embodiment, one substrate is glass or clear plastic coated with an abrasion resistant coating and the other substrate is a plastic, metal, fiberglass or composite substrate which may optionally be painted or coated. The plastic coated with an abrasion resistant coating can be any plastic which is clear, such as polycarbonate, acrylic, hydrogenated polystyrene or hydrogenated styrene conjugated diene block copolymers having greater than 50 percent styrene content. The coating can comprise any coating which is abrasion resistant such as a polysiloxane coating. Preferably, the coating has an ultraviolet pigmented light blocking additive. Preferably, the glass or coated plastic window has an opaque coating disposed in the region to be contacted with the adhesive to block UV light from reaching the adhesive. This is commonly referred to as a frit. Preferably, the opaque coating is an inorganic enamel or an organic coating.

In a preferred embodiment, the composition of the invention is applied to the surface of the glass or coated plastic, along the portion of the glass or coated plastic which is to be bonded to the structure. The composition is thereafter contacted with the second substrate such that a layer of the adhesive composition is disposed at a bondline between the glass or coated plastic and the second substrate. The composition is allowed to cure to form a durable bond between the glass or coated plastic and the substrate.

In another embodiment, the composition may be applied to the surface of the other substrate and then contacted with the glass or coated plastic as described. The adhesive is applied in a bead to the periphery of the window located such that it will contact the window flange when placed in the vehicle. The window with the adhesive located thereon is then placed into the flange with the adhesive located between the window and the flange. The adhesive bead preferably is a continuous bead that functions to seal the junction between the window and the window flange. A continuous bead of adhesive is a bead that is located such that the bead connects at each end to form a continuous seal between the window and the flange when contacted. Thereafter the adhesive is allowed to cure.

In one embodiment the composition of the invention is used to replace windows in structures or vehicles and most preferably in vehicles. The first step is removal of the previous window. This can be achieved by cutting the bead of the adhesive holding the old window in place and then removing the old window. Thereafter the new window is cleaned and primed. The old adhesive that is located on the window flange can be cut to remove the old window. Although the old adhesive can be removed before applying the adhesive of the invention and assembling the new window onto the vehicle or structure, it is common to apply the adhesive of the invention overtop of a thin layer of the old adhesive that remains affixed to the structure or vehicle. The window flange is preferably primed with a paint primer. Thereafter the window with adhesive disposed thereon is contacted with the window flange as described hereinbefore. In another embodiment the adhesive can be applied to the window flange instead of the window.

In another embodiment the compositions of the invention can be used to bond modular components together. Examples of modular components include vehicle modules, such as door, window or body.

The adhesive composition of the invention preferably exhibits a lap shear strength of at least 2.76 MPa (400 psi) after being cured at conditions of 23° C. and 50 percent relative humidity for 7 days. The adhesive composition of the invention preferably exhibits a Young's modulus of at least 3 MPa, as measured according to ASTM D412 (Die C) after being cured under the same conditions.

The adhesive composition of the invention preferably exhibits a growth in press flow viscosity of no more than 100%, more preferably no more than 50%, after being aged under nitrogen for 3 days at 65° C. before being cured.

The adhesive composition of the invention exhibits excellent heat and hydrolytic stability. Hydrolytic and heat stability can be assessed by evaluating the failure characteristics of the cured adhesive after immersing substrates bonded together by the cured adhesive in 90° C. water for various times, as set forth in the examples. The cured adhesive preferably exhibits 100% cohesive failure mode when evaluated using the adhesion test describe in the following examples, after being immersed in 90° C. water for 10 days or more.

The following examples are provided to illustrate the invention but are not intended to limit the scope thereof. All parts and percentages are by weight unless otherwise indicated.

In the following examples:

VORANOL 220-056N POLYOL is a nominally difunctional, poly(propylene oxide) having a hydroxyl number of 56 (equivalent weight 1000), available from The Dow Chemical Company.

VORANOL 232-036N POLYOL is a nominally trifunctional poly(propylene oxide) having a hydroxyl number of 36 (equivalent weight 1558), available from The Dow Chemical Company.

The Polyester Polyol is commercially available from Evonik as Dynacoll™ 7381.

Diisononyl Phthalate: plasticizer available from UPC Technology.

MDI is methylene diphenyl diisocyanate (isocyanate equivalent weight 125, isocyanate functionality 2.0) available as Isonate 125 M from The Dow Chemical Company.

The Polymeric MDI is sold commercially by The Dow Chemical Company as PAPI™ 20. It has an isocyanate functionality of 3.2 and an isocyanate equivalent weight of about 138.

Metacure™ T-9 is a stannous octoate urethane catalyst available from Air Products.

Diethyl Malonate is a commercially available product from Parchem Fine & Specialty Chemicals, New Rochelle, N.Y., USA.

The trimerized hexamethylene diisocyanate is Desmodur™ N3300 from Covestro. It has an isocyanate functionality of greater than 2.5 and an isocyanate content of 21.8% (isocyanate equivalent weight about 193).

The dimorpholinodiethyl ether catalyst is Jeffcat® DMDEE™ catalyst from Huntsman The dimethyltin dineodecanoate catalyst is Fomrez® UL-28 catalyst from Momentive Performance Materials.

The mercaptosilane is gamma-mercaptopropyletrimethoxysilane, commercially available from Momentive Performance Materials as Silquest A-189.

The amino silane is bis-(gamma-trimethoxysilylpropyl) amine, commercially available from Momentive Performance Materials as Silquest™ 9627.

The epoxysilane is gamma-glycidoxypropyltrimethoxysilane, commercially available from Momentive Performance Materials as Silquest™ A-187.

The trinonylphenyl phosphite is available commercially as Doverphos® 4 from Dover Chemical.

UVA Absorber A is Tinuvin® 571 from BASF.

The Light Stabilizer is Tinuvin® 765 from BASF.

The calcium carbonate is HUBERCARB™ Q325, available from J. M. Huber.

BETASEAL™ 43518 is a silane-containing clear glass primer from Dow Chemical Co.

BETASEAL™ 43520A is an isocyanate-containing black glass primer from Dow Chemical Co.

BETASEAL™ 43526 is a silane-containing black glass primer from Dow Chemical Co.

BETAPRIME™ 5500 is an isocyanate-containing black glass primer from Dow Chemical Co.

EXAMPLE 1 AND COMPARATIVE SAMPLES A-C

A. Preparation of Prepolymer Solution 1

363.68 g of Voranol 220-056 polyol, 527.04 g of Voranol 232-036 polyol and 32 g of diisononyl phthalate are charged into a 4-liter kettle, mixed and heated to 54° C. under nitrogen. All subsequent steps are performed under nitrogen. 160.64 g of molten MDI is added and mixed in. 0.08 g of the stannous octoate catalyst is added drop-wise. The temperature in the kettle rises due to the exothermic heat of reaction; the reaction mixture is maintained between 80° C. and 90° C. for 30 minutes. The reaction mixture is then cooled to 60° C. and 501.20 g of diisononyl phthalate and 15.36 g of diethyl malonate are added and mixed in for 30 minutes, followed by cooling to room temperature. The resulting Prepolymer Solution 1 has an isocyanate content of 1.25% by weight and a viscosity of 16,000 cps at 23° C. as measured according to the procedure disclosed in U.S. Pat. No. 5,922,809 at column 12, lines 38 to 49.

B. Preparation of Example 1 and Comparative Samples A, B and C 210 g of calcium carbonate, 61.25 g of clay and 372.75 g of Efltex™ S7100 carbon black are mixed and dried at 200° C. for about 20 hours, and then cooled in a closed container to form a filler mixture. The Elftex carbon black has an oil absorption of 117 cc of dibutyl phthalate/100 g.

Separately, 1045.28 g of Prepolymer Solution 1, 35 grams of a trimerized hexamethylene diisocyanate, 3.8 g of the dimorpholino diethyl ether catalyst and 2.63 g of a 10% solution of the dimethyltin dineodecanoate catalyst in diisononyl phthalate are charged into a 2 gallon mixer. The mixture is degassed and mixed under vacuum for 5 minutes. The vacuum is broken with nitrogen and then, 8.75 g of the mercaptosilane is added, followed by additional degassing and mixing under vacuum for 10 minutes. The vacuum is broken again with nitrogen and then, the filler mixture is added into the mixer. Then, the vacuum is applied slowly. When half of the vacuum is achieved, mixing is started to wet out the fillers for 2 minutes. The vacuum valve is then fully opened and further mixing is continued under full vacuum for 15 minutes. Thereafter, the mixture is scraped down and 10.5 g of trinonylphenyl phosphite is added, followed by mixing under vacuum for 10 minutes. The resulting adhesive composition (Example 1) is packaged into airtight tubes which are stored in nitrogen-filled sealed aluminum bags.

The press flow viscosity on adhesive samples is measured by determining the amount of time (in seconds) for 20 g of the adhesive composition to pass through a 4.0 mm orifice under conditions of 552 kPa applied pressure at 23° C., unless otherwise specified. The press flow viscosity of Example 1 is 30 seconds. After aging Example 1 adhesive composition for 3 days at 54° C. under nitrogen, the press flow viscosity increases only slightly, to 35 seconds.

Sag performance is evaluated by the following method. A metal panel of 10 cm height and 30 cm length is placed vertically on its longest side. A right angle triangular bead of the adhesive composition having a height of 1.8 cm and a base of 0.6 cm is dispensed along the top edge of the panel with the bead height perpendicular to the panel. After 30 minutes, the amount of drop or sag of the tip of the adhesive bead is measured in millimeters. Example 1 exhibits no measurable sag. After aging Example 1 adhesive for 3 days at 54° C. under nitrogen, it still exhibits no sag on this test.

Comparative Sample A is made in the same way, except the mercaptosilane is replaced with an equal weight of the aminosilane.

Comparative Sample B is made in the same way as Example 1, except the mercaptosilane is replaced by an equal weight of the epoxysilane.

Comparative Sample C is made in the same way as Example 1, except the dimethyltin dineodecanoate catalyst solution is replaced with an equal amount of Prepolymer Solution 1.

Round patties of Example 1 and Comparative Samples A and B are cured for 7 days at conditions of 23° C. and 50% relative humidity. Test coupons are cut from these cured sample patties and tested for tensile strength, elongation and Young's modulus (from 1 to 10% extension), all according to ASTM D412 (Die C). Results are as indicated in Table 1. Hardness is measured according to ASTM D2240.

TABLE 1

| Test | Comparative Sample A* | Example 1 | Comparative Sample B* |
|---|---|---|---|
| Tensile strength, psi (kPa) | 1271 | 1199 | 1327 |
| Elongation, % | 406 | 360 | 441 |
| Young's Modulus, MPa | 4.77 | 4.77 | 4.42 |
| Shore A hardness | 69.1 | 69.6 | 66.7 |

*Not an example of the invention.

Peel adhesion sample of Example 1 and Comparative Samples A and B is prepared as follows: dispense a triangular bead having a 6.3 mm base, a 12 mm height and 100 mm in length onto a bismuth enamel glass coupon (width 25 mm×length 150 mm) primed with BETAPRIME™ 5500. The bead is pressed with a release paper to reach a 3 mm in thickness, which is then cured for 5 days at 23° and 50% relative humidity. Thereafter, peel adhesion sample is soaked for 5, 7, 10 and 12 days, respectively, in a 90° C. hot water bath before testing. All peel adhesion samples are prepared and tested in duplicate per adhesive sample and per each test condition.

When tested, a slit (20-40 mm) is cut between the adhesive bead end and the substrate. The cured bead is then cut with a razor blade through to the tested substrate at a 60 degree angle while pulling back the end of the bead at >90 degree angle. Notches are cut about every 3-5 mm on the substrate. The degree of adhesion is evaluated as adhesive failure (AF), thin film failure (TF) and/or cohesive failure (CF). In case of AF, the cured bead can be separated from the tested substrate surface, while in CF. separation occurs within the sealant adhesive as a result of cutting and pulling and TF is a special case of CF in which there is a thin film of cured adhesive left on the substrate after cutting and testing. Results are as indicated in Table 2.

TABLE 2

Hot Water Aged Peel Adhesion Results on bismuth enamel glass panels coated with BETAPRIME™ 5500 glass primer.

| | Failure Mode | | |
|---|---|---|---|
| Soaking Time, 90° C. Water | Comparative Sample A* | Example 1 | Comparative Sample B |
| 5 days | 100% CF | 100% CF | 100% CF |
| 7 days | 100% CF | 100% CF | 0% CF |
| 10 days | 30-40% CF | 100% CF | 0% CF |
| 12 days | N.D. | 100% CF | N.D. |

Peel adhesion testing is performed in the same manner on bismuth enamel glass panels primed with BETASEAL™ 43526. Results are as indicated in Table 3.

TABLE 3

Hot Water Aged Peel Adhesion Results on bismuth enamel glass panels coated with BETASEAL™ 43526 glass primer

| | Failure Mode | | |
|---|---|---|---|
| Soaking Time, 90° C. Water | Comparative Sample A* | Example 1 | Comparative Sample B |
| 5 days | 100% CF | 100% CF | 100% CF |
| 7 days | 100% CF | 100% CF | 0% CF |
| 10 days | 40-100% CF | 100% CF | 0% CF |
| 12 days | 0% CF | 100% CF | N.D. |

Peel adhesion testing for Example 1 is also performed on a metal panel freshly coated with Gen™ V paint without paint primer. Example 1 exhibits 100% CF on the Gen™ V paint. When Comparative Sample C is evaluated in the same manner, the failure mode is only 10% CF. These results demonstrate the advantage of using a mixture of the dimorpholino diethylether catalyst with a metal-containing catalyst.

The lap shear adhesion of Example 1 is evaluated according to SAE J1529 test procedure. Duplicate test specimens are made by applying a triangular bead having a base of approximately 6.3 mm and a height of 8 mm height is applied along the width of a 25 mm by 100 mm of a bismuth-zinc fritted glass primed with both Betaseal™ 43518 and Betaseal™ 43520A. An e-coated metal coupon is immediately pressed onto the adhesive bead to form an overlap of 6.3 mm and a 6.3 mm thick adhesive bead between the substrates. The samples are cured for 3 days at 23° C. and 50 percent relative humidity. One sample is then evaluated immediately for lap shear strength at a pull rate of 50 mm/min. Another sample is further aged for 14 days at 40° C. and 100% relative humidity before testing. Results are as indicated in Table 4.

TABLE 4

Lap Shear Adhesion Results for Example 1

| Aging Conditions | Lap Shear Strength, kPa (psi) | Failure Mode |
|---|---|---|
| None | 3213 (495) | 100% CF |
| 14 Days/100 F./100% RH | 2964 (430) | 100% CF |

EXAMPLES 2 AND 3

Example 2 is prepared in the same general manner as Example 1, from the following ingredients:

| Ingredient | Weight % |
|---|---|
| Prepolymer Solution 1 | 56.33% |
| Diisononyl Phthalate | 3.0% |
| Polymeric MDI | 2.0% |
| Trimerized hexamethylene diisocyanate | 2.0% |
| Dimorpholino ether | 0.217% |
| Dimethyltin dineodecanoate (10% in diisononyl phthalate) | 0.15% |
| Mercaptosilane | 0.5% |
| Elftex ™ S7100 Carbon black | 22.7% |
| Clay | 3.5% |
| CaCO$_3$ | 9.0% |
| Trisnonylphenyl phosphite | 0.6% |

Example 3 is made in the same manner, except a carbon having an oil absorption of only 72 cc dibutyl phthalate/100 g (Monarch™ 120, from Cabot Corporation) is used instead of the Elftex™ carbon.

Example 2 exhibits an initial press flow viscosity of 48 seconds. Its press viscosity does not when it is heat aged for 3 days at 54° C. Example 2 exhibits no sag when evaluated before and after heat aging for 3 days at 54° C. Its Young's modulus (1-10% extension) is 8.76 MPa. Tensile strength is about 9000 kPa (1300 psi) and elongation is 248%. Shore A hardness is 81.

Example 3 exhibits an initial sag of 20 mm on the sag test. The results of Example 2 and Example 3 demonstrate the advantage of using a carbon black having high oil absorption in conjunction with the mercaptosilane.

EXAMPLE 4 AND COMPARATIVE SAMPLE D

Example 4 is prepared in the same general manner as Example 1, from the following ingredients:

| Ingredient | Weight % |
|---|---|
| Prepolymer Solution 1 | 56.93% |
| Diisononyl Phthalate | 2.6% |
| Polymeric MDI | 1.0% |
| Trimerized hexamethylene diisocyanate | 2.0% |
| Dimorpholino diethylether | 0.17% |
| Dimethyltin dineodecanoate (10% in diisononyl phthalate) | 1.0% |
| Mercaptosilane | 1.6% |
| Elftex ™ S7100 Carbon black | 21.2% |
| Clay | 13.0% |
| UVA Absorber A | 0.5% |

Comparative Sample D is made in the same manner, except the mercaptosilane is replaced with an equal weight of an aminosilane.

Example 4 exhibits no sag on the sag test after 3 day aging at 65° C. After same heat aging conditions, comparative Sample D exhibits 9 mm of sag on the test, and in addition the entire applied bead slides downward by about 1 mm, which is a very poor result.

Example 4 has an initial press viscosity of 43 seconds, which increases to about 51 seconds after the adhesive is aged for 3 days at 65° C. Example 4 has a viscosity heat growth of 18.6%. Example 4 has a much superior rheological stability than the Sample D.

EXAMPLE 5

A. Prepolymer Solution 2

280 grams of diisononyl phthalate are placed in a reaction vessel under nitrogen and heated to 50° C. 172.8 grams of molten MDI are added and mixed in, followed by the gradual addition of 1147.2 grams of the molten Polyester Polyol. The resulting reaction mixture is reacted under nitrogen for 40 minutes at 80 to 90° C., and the resulting Prepolymer Solution 2 is then stored in an airtight dry container. Prepolymer Solution 2 is solid at room temperature and has an isocyanate content of 2.0% by weight.

B. Preparation of Example 5

128 grams calcium carbonate, 56 grams clay and 348 grams Efltex® S7100 carbon black are mixed and dried at 200° C. for about 20 hours, and then cooled in a closed container to form a filler mixture.

Separately, the mixer vessel is first heated up to 65° C. with a heating jacket. Afterwards, 963.04 g of Prepolymer Solution 1, 12.8 g of the MDI, 40 grams of the trimerized hexamethylene diisocyanate, 0.96 g of the dimorpholino diethylether catalyst and 19.2 g of the 10% dimethyltin dineodecanoate catalyst in diisononyl phthalate are charged and mixed together under vacuum for five minutes. Then, 12.8 g of the mercaptosilane is added into mixer and mixed in under vacuum for 10 minutes. The vacuum is broken with nitrogen and the filler mixture is added. Then, the vacuum is applied slowly. When half of the vacuum is achieved, mixing is started to wet out the fillers for 2 minutes. The vacuum valve is then fully opened and further mixing is continued under full vacuum for 15 minutes. Thereafter, the mixture is scraped down and 1.39 g each of UVA Absorber A and the Light Stabilizer, 1.22 grams of trinonylphenyl phosphite and 14.4 g of molten Prepolymer Solution 2 are then added and mixed in under vacuum for another 10 minutes. The resulting adhesive composition (Example 5) is packaged into tubes.

Example 5 has an initial press flow viscosity of 47 seconds, which increases only to 51 seconds after Example 5 is aged for 3 days at 54° C. Example 5 exhibits no sag, either before or after heat aging. After curing for 7 days at 23° C. and 50% relative humidity, Example 5 exhibits a tensile strength of 7880 kPa (1143 psi), and elongation of 286%, a Young's modulus of 6.21 MPa and a Shore A hardness of 76.

What is claimed is:

1. A moisture-curable adhesive composition comprising:
   a) an isocyanate-terminated prepolymer having free isocyanate groups and an isocyanate equivalent weight of 840 to 5,000;
   b) 0.1 to 6 parts by weight, per 100 parts by weight of the adhesive composition, of at least one polyisocyanate compound having an isocyanate equivalent weight of up to 300, the at least one-polyisocyanate compound having a number average isocyanate functionality of at least 2.5;
   c) 0.1 to 4 parts by weight per 100 parts of the adhesive composition of at least one hydrolysable organosilane, the at least one hydrolysable organosilane including a mercaptosilane having one mercapto group and at least one hydrolysable silane group;
   d) at least one urethane catalyst and
   e) a carbon black filler, wherein the carbon black has an oil absorption number of at least 80 cubic centimeters of dibutyl phthalate per 100 g of the carbon black, as measured according to ASTM D-2414-09, and wherein the carbon black filler has an iodine number of at least 80, as measured according to ASTM D1510-11.

2. The adhesive composition of claim 1 wherein the mercaptosilane includes at least one mercaptoalkyl(trialkoxy)silane or mercaptoalkylmethyl(dialkoxy)silane.

3. The adhesive composition of claim 1 wherein the carbon black has an oil absorption number of at least 90 cubic centimeters of dibutyl phthalate per 100 g of the carbon black, as measured according to ASTM D-2414-09.

4. The adhesive composition of claim 1, wherein the isocyanate terminated prepolymer includes at least one reaction product of a polyether diol and a diisocyanate.

5. The adhesive composition of claim 1, wherein the isocyanate-terminated prepolymer includes a reaction product of a polyester diol having a melting temperature of 40 to 85° C. and a diisocyanate.

6. The adhesive composition of claim 1, which further includes a plasticizer.

7. The adhesive composition of claim 1, which exhibits a press flow viscosity of 5 to 200 seconds at 23° C.

8. A method of making an adhesive composition according to claim 1, comprising the steps of:
   A) forming the isocyanate-terminated prepolymer;
   B) mixing the isocyanate-terminated prepolymer with the at least one hydrolysable silane, and then
   C) combining the at least one polyisocyanate compound having an isocyanate equivalent weight of up to 210, urethane catalyst and carbon black with the mixture of the isocyanate-terminated prepolymer and the hydrolysable silane.

9. A method of making an adhesive composition according to claim 1, comprising the steps of:
   A) forming the isocyanate-terminated prepolymer;
   B) mixing the isocyanate-terminated prepolymer with the at least one polyisocyanate compound having an isocyanate equivalent weight of up to 210; and then
   C) combining the at least one hydrolysable silane, urethane catalyst and carbon black with the mixture of the isocyanate-terminated prepolymer and the at least one polyisocyanate compound having an isocyanate equivalent weight of up to 210.

* * * * *